United States Patent
Arad et al.

(10) Patent No.: US 9,203,761 B2
(45) Date of Patent: Dec. 1, 2015

(54) SYSTEMS AND METHODS OPTIMIZING BACKHAUL TRANSPORT

(71) Applicant: Taqua WBH, LLC, Richardson, TX (US)

(72) Inventors: Seyed Mohammad Ali Arad, Richmond Hill (CA); John Hoadley, McKinney, TX (US)

(73) Assignee: Taqua WBH, LLC, Richardson, TX (US)

( * ) Notice: Subject to any disclaimer, the term of this patent is extended or adjusted under 35 U.S.C. 154(b) by 195 days.

(21) Appl. No.: 13/712,543

(22) Filed: Dec. 12, 2012

(65) Prior Publication Data
US 2014/0160939 A1    Jun. 12, 2014

(51) Int. Cl.
| | |
|---|---|
| *H04J 1/16* | (2006.01) |
| *H04W 4/00* | (2009.01) |
| *H04W 72/00* | (2009.01) |
| *H04L 12/803* | (2013.01) |
| *H04L 12/725* | (2013.01) |
| *H04L 12/761* | (2013.01) |
| *H04L 12/707* | (2013.01) |
| *H04L 12/801* | (2013.01) |
| *H04W 28/08* | (2009.01) |
| *H04L 12/851* | (2013.01) |

(52) U.S. Cl.
CPC .............. *H04L 47/122* (2013.01); *H04L 45/16* (2013.01); *H04L 45/24* (2013.01); *H04L 45/302* (2013.01); *H04L 45/306* (2013.01); *H04L 45/308* (2013.01); *H04L 47/10* (2013.01); *H04L 47/2441* (2013.01); *H04W 28/08* (2013.01)

(58) Field of Classification Search
CPC ... H04L 47/122; H04L 47/10; H04L 47/2441; H04W 28/08
USPC .............. 455/436, 456.5, 509, 557, 561, 453; 370/236, 331, 231, 235, 329
See application file for complete search history.

(56) References Cited

U.S. PATENT DOCUMENTS

| | | | |
|---|---|---|---|
| 8,238,318 B1 | 8/2012 | Negus | |
| 2003/0231594 A1* | 12/2003 | Xu et al. | 370/236 |
| 2007/0142064 A1* | 6/2007 | Gutowski | 455/456.5 |
| 2008/0192692 A1* | 8/2008 | Chari et al. | 370/331 |
| 2008/0225737 A1 | 9/2008 | Gong et al. | |
| 2009/0029645 A1* | 1/2009 | Leroudier | 455/7 |
| 2012/0020307 A1* | 1/2012 | Henderson et al. | 370/329 |

(Continued)

OTHER PUBLICATIONS

International Search Report and Written Opinion issued for PCT/US2013/072655, dated Feb. 12, 2014, 7 pages.

*Primary Examiner* — Alpus H Hsu
*Assistant Examiner* — Camquyen Thai
(74) *Attorney, Agent, or Firm* — Norton Rose Fulbright US LLP (57) ABSTRACT

Systems and methods optimizing backhaul transport with respect to communication systems through the use of a heterogeneous backhaul link configuration and corresponding implementation of backhaul link path selection control to provide traffic offloading for traffic congestion mitigation are disclosed. Heterogeneous backhaul link configurations may include one or more backhaul links implementing a plurality of data paths providing different capabilities, such as may comprise a high reliability path and an unpredictable reliability path. Backhaul link path selection control of embodiments implements logic for determining when data is to be carried via one or more of the backhaul link paths.

29 Claims, 5 Drawing Sheets

(56) References Cited

U.S. PATENT DOCUMENTS

| | | |
|---|---|---|
| 2012/0063383 A1 | 3/2012 | Barbieri et al. |
| 2012/0106341 A1 | 5/2012 | Arad et al. |
| 2012/0149382 A1 | 6/2012 | Fox et al. |
| 2012/0264430 A1* | 10/2012 | Kim et al. ............... 455/436 |
| 2013/0012251 A1* | 1/2013 | Roddy et al. ............ 455/509 |
| 2013/0070742 A1* | 3/2013 | Picker et al. ........... 370/338 |

* cited by examiner

SYSTEMS AND METHODS OPTIMIZING BACKHAUL TRANSPORT

TECHNICAL FIELD

The invention relates generally to communication systems and, more particularly, to optimizing backhaul transport with respect to communication systems.

BACKGROUND OF THE INVENTION

The use of various devices which facilitate communications and/or which themselves utilize communications has become nearly ubiquitous. For example, personal computers (PCs), personal digital assistants (PDAs), electronic book readers, cellular telephones, personal media players, etc. widely in use today often utilize network connectivity, such as to provide user communication links, upload/download of content, operations and control communication, etc. Accordingly, various network infrastructure has been deployed to provide networks, such as local area networks (LANs), metropolitan area networks (MANs), wide area networks (WANs), and the Internet, facilitating the foregoing communications.

The foregoing network infrastructure often implement various forms of communication links for facilitating the desired communications. For example, various edge devices (e.g., access points (APs), base stations (BSs), node Bs, etc.) may provide wireless links for connecting terminal devices (e.g., PCs, PDAs, electronic book readers, cellular telephones, personal media players, etc.) to a network to facilitate communications. Backhaul links may, for example, be provided between such edge devices and other network nodes of the network infrastructure (e.g., routers, switches, concentrators, gateways, etc.) to provide broadband communication to the core or backbone network. Such backhaul links may, for example, be used to provide trunking with respect to the data flows of all active terminal devices in communication with a corresponding access point providing a backhaul link to network resources.

The foregoing backhaul links may comprise wireless (e.g., radio frequency (RF)) or wireline (e.g., copper cable or fiber optic) links. Irrespective of the particular communication media utilized with respect to the backhaul links, these links are typically provided as high reliability links in order to facilitate predictable communications meeting the requisite quality of service (QoS) obligations for the terminal devices or other communications endpoints. Such high reliability links provide a limited network resource (e.g., bandwidth limited, channel limited, capacity limited, etc.). For example, wireless backhaul links are often provided using licensed spectrum, such that a channel or channels within the licensed spectrum is reserved for providing one or more backhaul links. The use of such licensed spectrum is advantageous because interferers (i.e., systems unassociated with the network or backhaul link operating within the licensed spectrum) may be substantially eliminated due to the restrictions of the licensing. However, the licensed spectrum comprises a specific block of spectrum, the size of which presents limitations with respect to the channels, bandwidth, and capacity that may be accommodated.

It is not uncommon for the demand for communications by various network nodes (e.g., the aforementioned terminal devices) to, at least temporarily, exceed the capabilities of a backhaul link used in providing a network link. Accordingly, various schemes for avoiding network congestion have been tried. For example, network congestion avoidance according to such schemes may be implemented by dropping data packets as network traffic reaches or nears network resource congestion. As can be readily appreciated, it is generally not desirable to drop data packets as such behavior may result in failed communication links (e.g., where a terminal device detects a sufficient level of dropped packets to conclude the link in unreliable or otherwise unacceptable), poor quality of service (e.g., jitter, missing data, etc.), inefficient operation (e.g., repeated data retransmission attempts, repeated attempts to reestablish the link, etc.), and the like.

BRIEF SUMMARY OF THE INVENTION

The present invention is directed to systems and methods optimizing backhaul transport with respect to communication systems through the use of a heterogeneous backhaul link configuration and corresponding implementation of backhaul link path selection control to provide traffic offloading for traffic congestion mitigation. A heterogeneous backhaul link configuration according to an embodiment herein includes one or more backhaul links implementing a plurality of data paths, wherein data paths of the plurality of data paths provide different capabilities (e.g., differing reliability, robustness, etc.). For example, a backhaul link of embodiments herein may comprise a high reliability path (e.g., using licensed RF spectrum) and an unpredictable reliability path (e.g., using unlicensed RF spectrum). Backhaul link path selection control of embodiments implements logic for determining when data is to be carried via one or more of the backhaul link paths. Continuing with the foregoing example, the backhaul link path selection control may determine during periods of backhaul congestion (e.g., when the high reliability path is at or near capacity) that some portion of the data is to be carried by a high reliability path, another portion of the data is to be carried by an unpredictable reliability path, and/or still another portion of the data is to be dropped.

Backhaul transport configurations of embodiments of the invention provide operation for optimizing point-to-point backhaul link transport (e.g., a non-line of sight point-to-point backhaul link) through implementing backhaul link path selection control to provide traffic offloading for traffic congestion mitigation. For example, in a point-to-point backhaul transport configuration the backhaul link path selection control may provide for all backhaul data to be carried by a high reliability path of the point-to-point backhaul link until the capacity of that path is neared or reached. Thereafter, the backhaul link path selection control may determine data to be carried by an unpredictable reliability path of the point-to-point backhaul link during the period in which the high reliability path is experiencing congestion. Determinations by logic of the backhaul link path selection control regarding the carrying of data by the unpredictable reliability path may be based upon QoS requirements for the data flows, fairness metrics for the data flows, aspects of the data flows (e.g., application type, Internet protocol (IP) address, port, etc.), and/or the like.

Backhaul transport configurations according to embodiments herein provide operation for optimizing point-to-multipoint backhaul link transport (e.g., non-line of sight point-to-multipoint backhaul links) through implementing backhaul link path selection control to provide traffic offloading for traffic congestion mitigation, wherein the links of the point-to-multipoint backhaul links share resources (e.g., utilize a same channel frequency). For example, in a point-to-multipoint backhaul transport configuration the backhaul link path selection control may provide for all backhaul data to be carried by high reliability paths of the point-to-multipoint backhaul links until the capacity of a shared backhaul link resource of the high reliability paths is neared or reached. Thereafter, the backhaul link path selection control may determine data, if any, to be carried by an unpredictable reliability path of one or more backhaul link of the point-to-multipoint backhaul links and/or data, if any, to be dropped during the period in which the shared backhaul link resource is congested. Determinations by logic of the backhaul link path selection control regarding the carrying of data by the unpredictable reliability path and data to be dropped may be based upon the source of the congestion, the quality of the unpredictable reliability path, QoS requirements for the data flows, fairness metrics for the data flows, aspects of the data flows, and/or the like.

In operation according to embodiments herein, the decisions regarding the handling of backhaul data made by the backhaul link path selection control are preferably made with respect to data flows rather than for individual data packets. Accordingly, the number of data flows, and correspondingly the number of network nodes, affected by the use of an unpredictable reliability path for backhaul transport of data and/or the dropping of data according to embodiments may be minimized.

From the foregoing it can be appreciated that a carrier or other entity providing backhaul communication infrastructure may provide a plurality of transport paths for a backhaul link, wherein the backhaul link paths have unequal capabilities. One such backhaul link path may provide high reliability but limited capacity (e.g., the high reliability backhaul link path may comprise a licensed non-line of sight wireless communication link). Another such backhaul link path may provide unpredictable reliability (e.g., subject to unpredictable interference) but provide relatively high capacity (e.g., the unpredictable reliability backhaul link may comprise an unlicensed non-line of sight wireless communication link). Operation of such a heterogeneous backhaul link configuration according to embodiments of the invention supports additional backhaul capacity beyond that which can be transported by the high reliability path alone. Thus, although the risk of overflow from the high reliability path may be high due to the limited availability of high reliability link capacity, both high reliability and unpredictable reliability paths can be used simultaneously to provide backhaul transport meeting QoS policies for the backhaul link, thereby avoiding or minimizing dropping of data during periods of congestion. For example, in particular circumstances the unpredictable reliability path of a backhaul link may be used to carry backhaul traffic (e.g., low priority traffic, best efforts traffic, etc.) during periods in which a high reliability path of the backhaul link experiences congestion.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
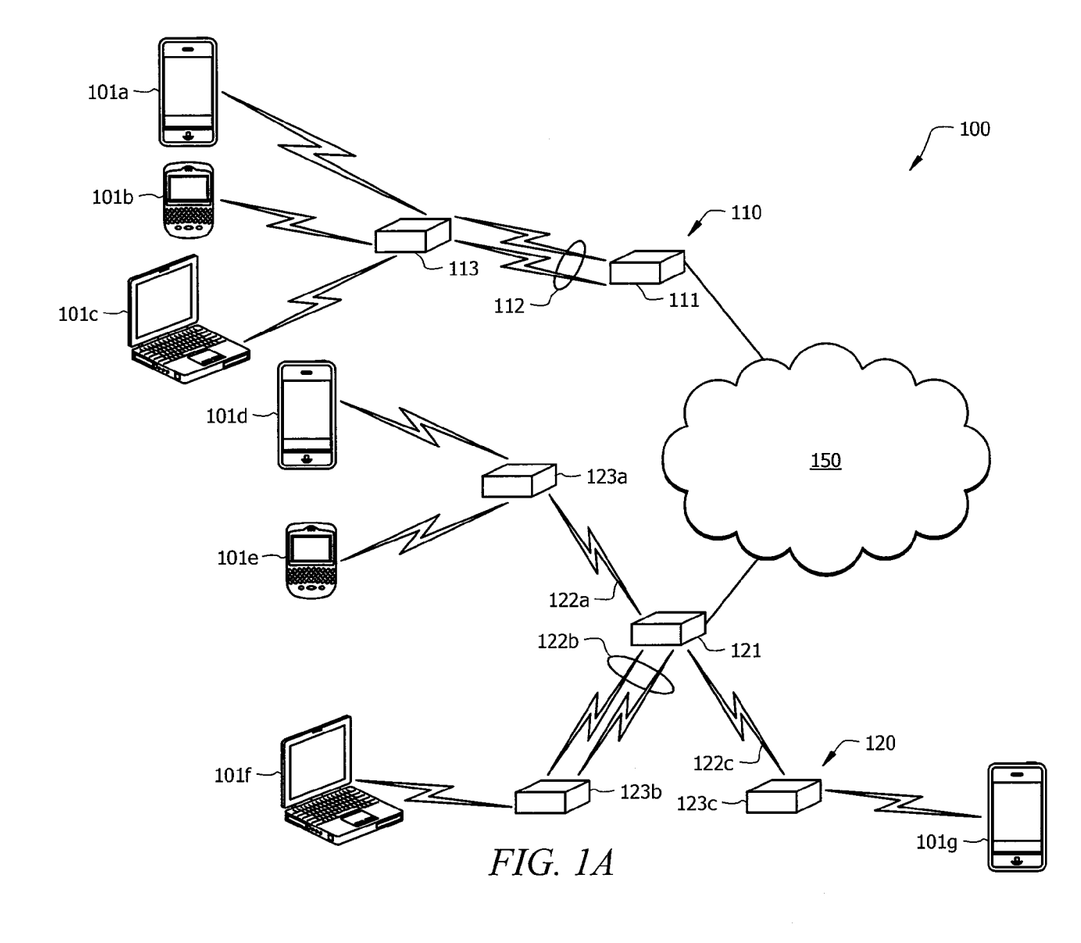
FIGS. 1A-1D show systems adapted to use heterogeneous backhaul link configurations implementing backhaul link path selection control to provide traffic offloading for traffic congestion mitigation according to embodiments of the invention.

FIG. 1A shows system 100 using heterogeneous backhaul link configurations implementing backhaul link path selection control to provide traffic offloading for traffic congestion mitigation according to embodiments of the invention. In particular, system 100 includes exemplary point-to-point backhaul transport portion 110 and point-to-multipoint backhaul transport portion 120 providing communication between various devices (e.g., user devices 101a-101g) and other nodes (e.g., nodes of network 150), as will be discussed in further detail below.

User devices 101a-101g may comprise any number of forms of devices for which data communication is utilized, such as smart phones (e.g., user devices 101a, 101d, and 101g), personal digital assistants (PDAs) (e.g., user device 101b), personal computers (PCs) (e.g., user devices 101c and 101f), cellular telephones (e.g., user device 101e), personal media players, Internet appliances, etc. Communication may be provided by the links of system 100 by and between such user devices and/or other devices (e.g., hubs 111 and 121, access points 113 and 123a-123c, and nodes of network 150).

Network 150 may comprise various forms of networks, such as local area networks (LANs), metropolitan area networks (MANs), wide area networks (WANs), the Internet, the public switched telephone network (PSTN), cellular networks, cable transmission networks, etc. Accordingly, data originated from and/or directed to various devices (e.g., user devices 101a-101g, hubs 111 and 121, and access points 113 and 123a-123c) may be carried by network 150.

Access points 113 and 123a-123c providing communication links with respect to the user devices may comprise various forms of communications nodes. For example, access points 113 and 123a-123c may comprise WiFi access points, 3G and/or 4G access points, femto cells, base stations, radio base repeaters, and/or the like. Similarly, hubs 111 and 121 providing communication links with respect to access points 113 and 123a-123c may comprise various forms of communications nodes. For example, hubs 111 and 121 may provide hub configurations which include switch, router, gateway, and/or the like functionality operable to facilitate communications as described herein.

Figure 1B:
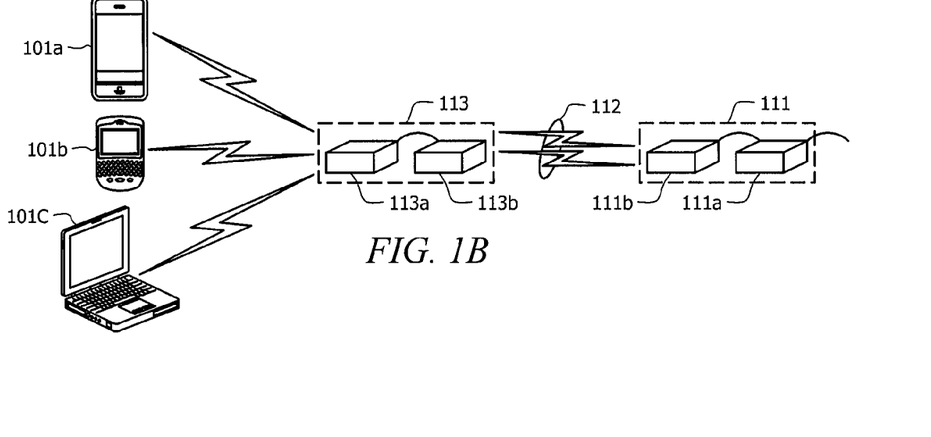

Although shown in the embodiment illustrated in FIG. 1A as single devices, it should be appreciated that access points and/or hubs herein may be provided as a plurality of separate devices. For example, an embodiment may utilize a hub device coupled to a backhaul link device (e.g., hub 111a coupled to backhaul interface 111b forming hub 111 of FIG. 1B). Likewise, an embodiment may utilize an access point device coupled to a backhaul link device (e.g., access point 113a coupled to backhaul interface 113b forming access point 113 of FIG. 1B).

To facilitate the communication of data by and between the various devices, backhaul links 112 and 122a-122c are implemented between respective ones of hubs 111 and 121 and access points 113 and 123a-123c. That is, in the illustrated embodiment, backhaul link 112 provides point-to-point backhaul communication between hub 111 and access point 113, such as for communication of data originated from and/or directed to user devices 101a-101c and/or access point 113. Similarly, backhaul links 122a-122c provide point-to-multipoint backhaul communication between hub 121 and access points 123a-123c, such as for communication of data originated from and/or directed to user devices 101d-101g and/or access points 123a-123c.

Although the links between the access points and user devices and between the access points and hubs of the illustrated embodiment are shown as wireless links (e.g., RF links, such as cellular communication links, WiFi links, WiMax links, wireless LAN (WLAN) links, BLUETOOTH links, etc.), it should be appreciated that there is no limitation to the use of wireless links according to embodiments herein. For example, one or more of the links between an access point and an associated user device and/or between a hub and an associated access point may comprise a wireline link (e.g., copper cable or fiber optic links). Likewise, although the links between the hubs and remainder of the network of the illustrated embodiment are shown as wireline links, there is no limitation to the use of wireline links according to embodiments herein. Accordingly, one or more of these links may comprise a wireless link according to embodiments herein.

It should be appreciated that both point-to-point backhaul link transport portion 110 and point-to-multipoint backhaul transport portion 120 of the illustrated embodiment include heterogeneous backhaul links adapted for traffic offloading for traffic congestion mitigation. In particular, backhaul link 112 of point-to-point backhaul link transport portion 110 of embodiments provides a heterogeneous backhaul link configuration implementing a plurality of data paths, wherein the data paths provide different capabilities (e.g., differing reliability, robustness, etc.). Similarly, backhaul link 122b of point-to-multipoint backhaul link transport portion 120 of embodiments provides a heterogeneous backhaul link configuration implementing a plurality of data paths, wherein data paths provide different capabilities. For example, backhaul links 112 and 122b of embodiments herein may comprise a high reliability path (e.g., using licensed RF spectrum) and an unpredictable reliability path (e.g., using unlicensed RF spectrum).

The high reliability paths and unpredictable reliability paths utilized according to embodiments may comprise various configurations of communication paths and may be designated as high reliability or unpredictable reliability depending upon attributes relevant to the particular situation. For example, high reliability paths and unpredictable reliability paths can be predetermined (e.g. licensed non-line of sight (NLOS) paths may be designated as high reliability paths while unlicensed WiFi paths may be designated as unpredictable reliability paths). Additionally or alternatively, high reliability paths and unpredictable reliability paths can be determined by the monitoring the communication links (e.g., packet error rate (PER), receive signal strength indication (RSSI), signal to interference plus noise ratio (SINR), etc.), wherein the designation as high reliability and unpredictable reliability may be dynamically changed in response to such monitoring. It should be appreciated from the foregoing that the multiple paths of a heterogeneous backhaul link need not comprise communication paths of a same network, and thus traffic may be offloaded to different networks according to embodiments herein.

Figure 1C:
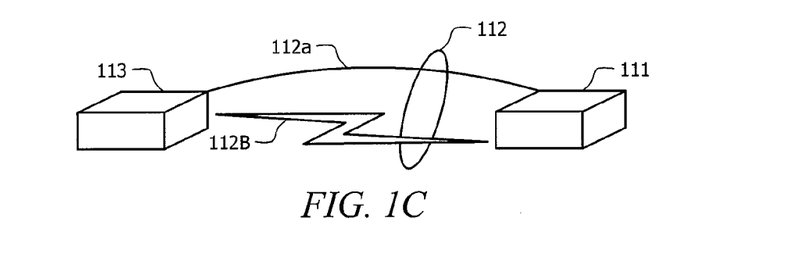
Figure 1D:
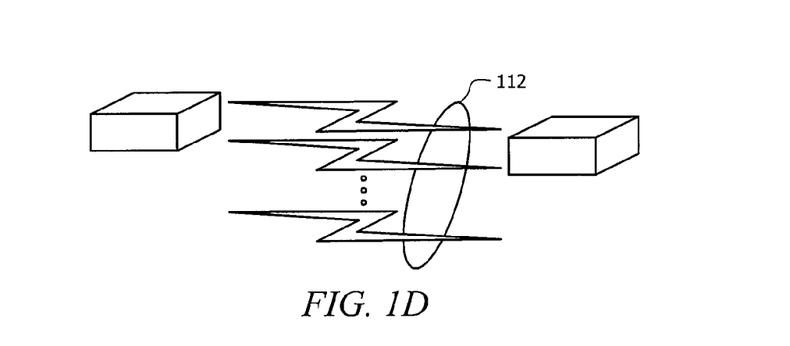

Although the data paths of the illustrated embodiment are both shown as wireless links, it should be appreciated that there is no limitation to the use of such wireless links according to embodiments herein. For example, one or more of the data paths of a heterogeneous backhaul link may comprise a wireline link, such as wireline link 112a of FIG. 1C. As can be appreciated from the embodiment illustrated in FIG. 1C, a mixture of wirleline links (e.g., wireline link 112a) and wireless links (e.g., wireless link 112b) may be utilized in providing a heterogeneous backhaul link. Moreover, there is no limitation to the use of two paths in a heterogeneous backhaul link, as shown in FIG. 1D.

The high reliability path provides a primary backhaul link data path according to embodiments, and thus all data flows over the high reliability path when there is no congestion on the high reliability path. However, when there is congestion on the high reliability path, path selection logic of embodiments herein selects which data flows are routed through the unpredictable reliability path. For example, low priority data flows (e.g., data flows having low QoS requirements, source or destinations identified as low priority, associated with applications designated as low priority, etc.) may be routed over the unpredictable reliability path during periods of high reliability path congestion. Stated another way, in case of high reliability path congestion, excess lowest priority data flows are preferably routed over the unpredictable reliability path and all other traffic is preferably routed over the high reliability path. In operation according to embodiments, only the low priority flows needed to provide capacity relief with respect to the high reliability path are routed over the unpredictable reliability path. The low priority flows are preferably again routed over the high reliability path when the high reliability path congestion has receded. For example, after a period (e.g., seconds or minutes) of high reliability path capacity availability (e.g., a threshold percentage of free capacity, a threshold amount of free capacity, free capacity sufficient to accommodate one or more flows currently routed over the unpredictable reliability path, etc.), one or more low priority flow may be rerouted over the high reliability path.

As can be appreciated from the foregoing, a goal according to embodiments is to keep the high reliability path operating at or near capacity. Thus, the unpredictable reliability path is used according to embodiments only for low priority data flows as a "best efforts" attempt to provide transport without dropping the flows. In operation according to embodiments, the path selection logic implements prioritization with respect to the flows routed over the unpredictable reliability path to address congestion experienced with respect to this link (e.g., determining which flows are to be dropped when both the high reliability path and unpredictable reliability path are congested).

Figure 2:
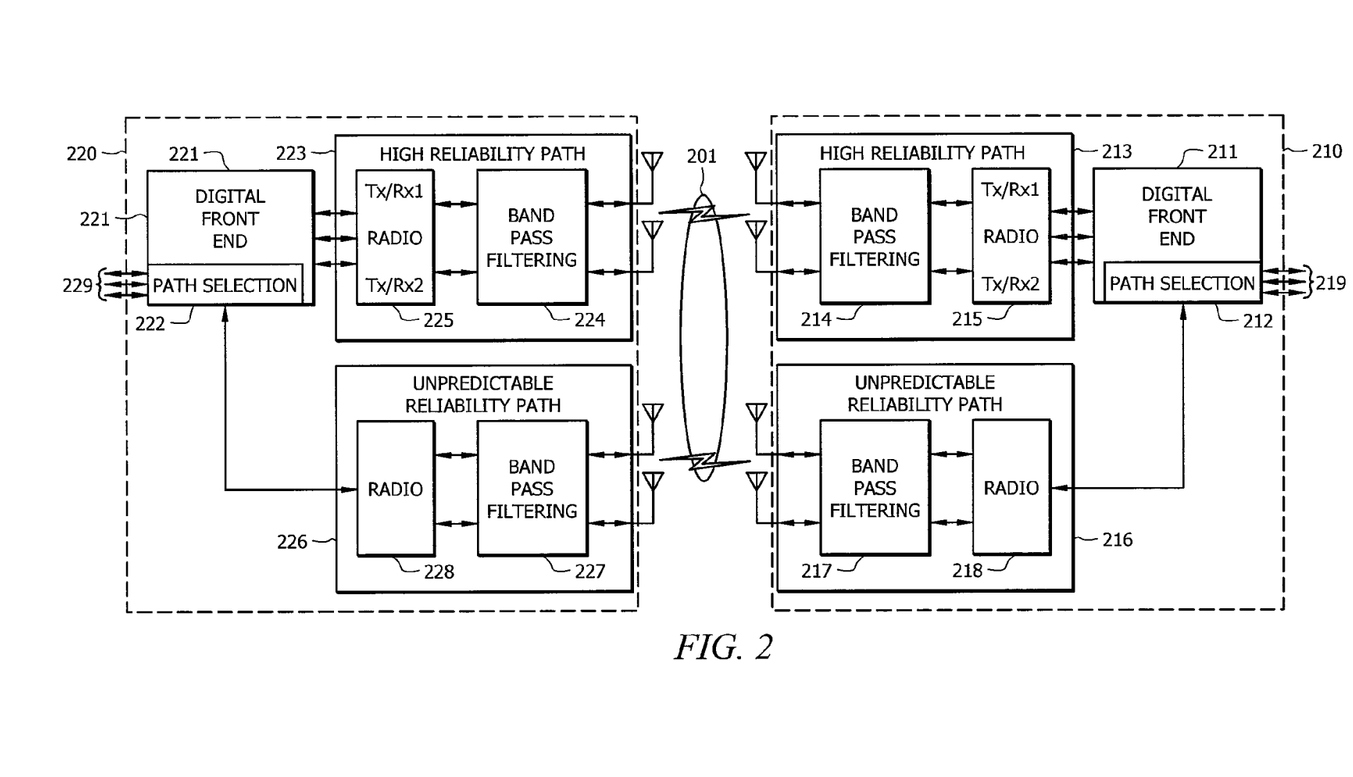
FIG. 2 shows detail with respect to heterogeneous backhaul link node configurations according to embodiments of the invention.

Directing attention to FIG. 2, a block diagram showing detail with respect to hub 210 and access point 220 providing heterogeneous backhaul link 201 according to embodiments is shown. It should be appreciated that hub 210 of FIG. 2 may correspond to any of a number of hubs providing backhaul communication, such as either of hubs 111 and 121 of FIG. 1A. Similarly, access point 220 of FIG. 2 may correspond to any of a number of access points providing backhaul communication, such as either of access points 113 and 123b of FIG. 1A.

The detail provided in FIG. 2 comprises functional blocks utilized in providing backhaul communications using a heterogeneous backhaul link configuration according to embodiments herein. Accordingly, additional functional blocks that may form a part of a hub and/or access point, but which are not specifically adapted to the use of a heterogeneous backhaul link may not be shown. For example, appropriate network interface functional blocks may be coupled to interfaces 219 of hub 210 to facilitate connection to network 150. Similarly, appropriate radio functional blocks may be coupled to interfaces 229 of access point 220 to facilitate connection to user devices of user devices 101a-101g. Such additional functionality is well known to those of ordinary skill in the art and thus will not be described in detail herein.

Although discussed with reference to circuitry of a hub and access point, it should be appreciated that the circuitry of FIG. 2 may be provided separate from a corresponding hub, access point, or other device with which backhaul communications are facilitated using the heterogeneous backhaul link configurations herein. For example, the circuitry of hub 210 and/or access point 220 may comprise an applique or external device which may be coupled to another device (e.g., network node, such as a network hub or access point facilitating network communications) to provide backhaul communications as described herein.

The embodiment illustrated in FIG. 2 provides a backhaul link in which both ends (hub 210 and access point 220) have a plurality of radios (high reliability path radio 213 and unpredictable reliability path radio 216 for hub 210 and high reliability path radio 223 and unpredictable reliability path radio 226 for access point 220) which are operable simultaneously to provide the plurality of data paths of the heterogeneous backhaul link. The radios may comprise circuitry (e.g., transceiver radios 215, 218, 225, and 228, filters 214, 217, 224, and 227, modulators, analog to digital converters, digital to analog converters, digital signal processors, mixers, etc.) appropriate to providing the communications for the corresponding data path. The radios of either end of the heterogeneous backhaul link are preferably adapted to provide data paths having different capabilities (e.g., differing reliability, robustness, etc.), such as may comprise the use of different RF spectrum, different communication protocols, different modulation schemes, different data rates, etc. For example, high reliability path radios 213 and 223 may be adapted to utilize licensed RF spectrum and associated communications protocols for providing a high reliability path of the backhaul link while unpredictable reliability path radios 216 and 226 may be adapted to utilize unlicensed RF spectrum and associated communications protocols for providing an unpredictable reliability path of the backhaul link.

It should be appreciated that, although two radios are shown for each end in the illustrated embodiment, different numbers of radios may be utilized by embodiments of the invention (e.g., providing a plurality of high reliability paths and/or a plurality of unpredictable reliability paths). Moreover, the particular configuration of the plurality of radios may differ than that shown in the illustrated embodiment. For example, rather than comprising separate radios as in the illustrated embodiment, multiple radios as used according to embodiments herein may be mechanically packaged together.

In operation according to embodiments of the invention, backhaul link path selection control is implemented with respect to one or more node of a backhaul link (e.g., hub 210 and/or access point 220 providing backhaul link 201) for optimizing backhaul transport using the aforementioned heterogeneous backhaul link configurations by providing traffic offloading for traffic congestion mitigation. For example, backhaul link path selection control of embodiments implements logic for determining when data is to be carried via one or more of the backhaul link paths of a heterogeneous backhaul link. Accordingly, hub 210 and access point 220 of the embodiment illustrated in FIG. 2 include digital front end circuitry 211 and 221, respectively. Digital front end circuitry of embodiments comprises a processor-based system operable under control of an instruction set to provide operation as described herein. Such processor-based systems may comprise a general purpose processor (e.g., a central processing unit (CPU), such as a processor from the CORE line of processors available from Intel Corporation) and/or a special purpose processor (e.g., an application specific integrated circuit (ASIC) (e.g., with an ARM processor) or a field programmable gate array (FPGA)), associated circuitry (e.g., memory, input/output, interfaces, etc.), and instruction set (e.g., software, firmware, logic algorithms, etc.).

Digital front end circuitry 211 and 221 of the illustrated embodiment comprise path selection logic 212 and 222, respectively, operable to provide backhaul link path selection responsive to current backhaul traffic conditions. Such logic implements a single QoS or other data flow priority (e.g., source or destinations priority, applications priority, etc.) function with respect to the multiple paths of the backhaul link according to embodiments herein. For example, backhaul link path selection control provided by the path selection logic may determine, during periods of backhaul congestion, that some portion of the backhaul data is to be carried by the high reliability path (e.g., using high reliability path radios 213 and 223), another portion of the backhaul data is to be carried by an unpredictable reliability path (e.g., using unpredictable reliability path radios 216 and 226), and/or still another portion of the data is to be dropped (e.g., by digital front end circuits 211 and 221) based upon QoS and/or other attributes of the data flows. Accordingly, both high reliability and unpredictable reliability paths can be used simultaneously to provide backhaul transport, thereby avoiding or minimizing dropping of data during periods of backhaul link congestion. For example, in particular circumstances the unpredictable reliability path of backhaul link 201 may be used to carry backhaul traffic (e.g., low priority traffic, best efforts traffic, etc.) during periods in which the high reliability path of backhaul link 201 experiences congestion.

It should be appreciated that, although the path selection logic 212 and 222 is shown in the illustrated embodiments as being separate from the radios, and being operable to receive signaling from the radios (e.g., PER, etc.) and to make routing decisions for the data flows, embodiments of the invention are not limited to such configurations. For example, embodiments of the invention may utilize a configuration in which path selection logic is integrated with the high reliability radio and operable, in a heterogeneous backhaul link implementation, to receive signaling from the unpredictable reliability radio.

In operation according to embodiments of the invention, path selection logic 212 and/or 222 operates to allocate data flows to the high reliability path or unpredictable reliability path of a backhaul link based upon various information in or associated with the data flows. For example, service classes and QoS attributes are provisioned such that network traffic may be classified into a particular service class based on packet parameters such as propagate bit (p-bit) or type of service (TOS) bits. Traffic allocation to the backhaul link paths, as well as determinations regarding flows to be dropped, may implement decisions based upon traffic priority (e.g., using QoS markings in the data packets) and information regarding the congestion of the high reliability path (e.g., level of congestion, source of congestion, etc.). For example, path selection logic of embodiments may determine the paths to carry particular data flows based on congestion and QoS requirements for the particular data flows. The path selection logic of embodiments preferably does not change the packet data, such as p-bits or TOS bits, but rather makes backhaul link path data routing and/or data dropping decisions using the data.

It should be appreciated that, although an exemplary embodiment has been described above with reference to the use of QoS attributes for backhaul link path data flow routing decisions and/or data flow dropping decisions, embodiments of the invention may utilize additional or alternative information. For example, embodiments operate to analyze the payload data to determine one or more aspect of the data flows (e.g., the type of application associated with the data flow, the source and/or destination of the data flow, the type of data carried in the data flow, etc.) in determining the backhaul link path routing for particular data flows during periods in which a high reliability path is congested. Path selection logic may operate to route data flows for particular applications (e.g., "low priority" applications, such as Internet browser traffic, media streaming traffic, etc.) through an unpredictable reliability link during periods of high reliability link congestion. Additional or alternative information used in decision making by path selection logic of embodiments includes a source of the congestion, the quality of the unpredictable reliability path, fairness metrics for the data flows, and/or the like.

Although operation of path selection logic of exemplary embodiments has been described above with respect to priority based path selection for the various data flows, it should be appreciated that path selection logic of embodiments further operates to provide priority based selection for data flows carried by a particular path. For example, path selection logic herein may operate to prioritize the data flows initially selected for routing through the unpredictable reliability path during periods of high reliability path congestion. In particular, the traffic offloaded from the high reliability path may itself be sufficient to cause congestion on the unpredictable reliability path. Thus, path selection logic of embodiments herein may further prioritize these data flows (e.g., based upon QoS requirements for the data flows, fairness metrics for the data flows, aspects of the data flows, and/or the like). The lower priority ones of the data flows initially routed to the unpredictable reliability path may be dropped, or routed to yet a less desirable path (e.g., more unpredictable reliability, poorer quality, etc.), to a point at which the unpredictable reliability path capacity is not exceeded.

The foregoing heterogeneous backhaul links implemented according to embodiments of the invention may facilitate communication with respect to a number of different backhaul transport configurations. For example, backhaul transport configurations of embodiments of the invention provide operation for optimizing point-to-point backhaul link transport (e.g., point-to-point backhaul transport portion 110 of FIG. 1A). Likewise, backhaul transport configurations according to embodiments herein provide operation for optimizing point-to-multipoint backhaul link transport (e.g., point-to-multipoint backhaul transport portion 120 of FIG. 1A).

Figure 3:
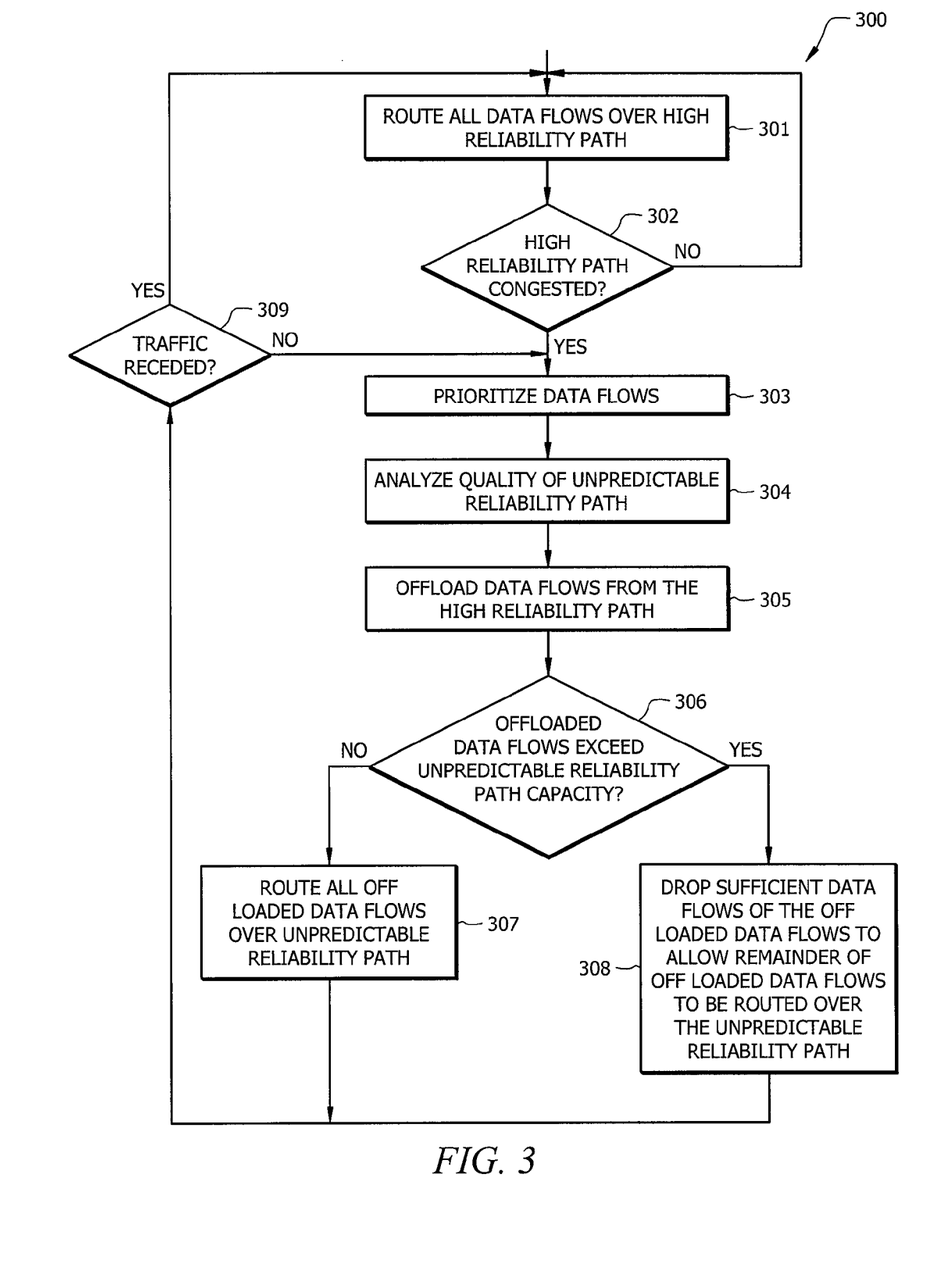
FIG. 3 shows a flow diagram of backhaul link path selection control with respect to a point-to-point backhaul transport configuration of embodiments of the invention.

In a point-to-point backhaul transport configuration the path selection logic may provide for all backhaul data to be carried by a high reliability path of the point-to-point backhaul link (e.g., the high reliability path of heterogeneous backhaul link 112 of FIG. 1A) until the capacity of that path is neared or reached. Thereafter, the path selection logic may determine data to be carried by an unpredictable reliability path of the point-to-point backhaul link (e.g., the unpredictable reliability path of heterogeneous backhaul link 112) during the period in which the high reliability path is experiencing congestion. Flow 300 of FIG. 3 shows operation of embodiments of path selection logic (e.g., path selection logic 212 and/or path selection logic 222 of hub 210 and access point 220 of FIG. 2) to provide data flow routing and/or dropping control with respect to a point-to-point heterogeneous backhaul link configuration consistent with the foregoing.

At block 301 of the illustrated embodiment all data flows are routed over the high reliability path of the heterogeneous backhaul link. Accordingly, the high reliability path provides a primary backhaul link data path according to the illustrated embodiment.

At block 302 a determination is made as to whether the high reliability path is experiencing congestion. For example, the demand for backhaul data flow communication may be analyzed with respect to the capacity of the high reliability path to determine if the high reliability path is at or near capacity. If the high reliability path is not congested, processing according to the illustrated embodiment returns to block 301 for all data flows to be routed over the high reliability path. However, if the high reliability path is congested, processing according to the illustrated embodiment proceeds to block 303.

At block 303 of the illustrated embodiment the backhaul data flows are prioritized. For example, the data flows may be prioritized based upon QoS requirements for the data flows, fairness metrics for the data flows, aspects of the data flows (e.g., application type, Internet protocol (IP) address, port, etc.), and/or the like.

At block 304 the quality (e.g., reliability measure) of the unpredictable reliability path of the heterogeneous backhaul link is analyzed (e.g. PER, RSSI, SINR, etc.). For example, because of the unpredictable reliability of the path, the quality of the path may vary with time, such as due to variations in interference, noise, etc. The instantaneous quality of the unpredictable reliability path may limit the capacity, bandwidth, throughput, or even availability of the unpredictable reliability path at any particular time.

One or more lower priority data flows sufficient to alleviate the congestion being experienced on the high reliability path (e.g., demand in excess of the high reliability path capacity) is offloaded from the high reliability path at block 305. For example, a number of the lowest priority data flows, as determined by the data flow prioritization, may be selected for offloading from the high reliability path to avoid the congestion. It should be appreciated that the data flows offloaded, although described above as "lower priority" data flows, may include high priority data flows (e.g., lower priority ones of the high priority data flows). For example, where the analysis of the quality of the unpredictable reliability path indicates that the quality of the path is high, higher priority data flows may be offloaded where congestion is high and/or low priority data flows are few.

A determination is made as to whether the data flows offloaded from the high reliability path exceed the capacity of the unpredictable reliability path at block 306. For example, the present channel conditions experienced in the unpredictable reliability path may establish a particular level of capacity available with respect to the unpredictable reliability path which may or may not be sufficient to carry any or all of the data flows offloaded from the high reliability path.

If, at block 306, it is determined that the data flows offloaded from the high reliability path do not exceed the capacity of the unpredictable reliability path, processing according to the illustrated embodiment proceeds to block 307. At block 307 all of the data flows offloaded from the high reliability path are routed over the unpredictable reliability path.

If, however, at block 306, it is determined that the data flows offloaded from the high reliability path do exceed the capacity of the unpredictable reliability path, processing according to the illustrated embodiment proceeds to block 308. At block 308 a sufficient number of the data flows offloaded from the high reliability path are dropped to allow the remainder of the offloaded data flows to be routed over the unpredictable reliability path. For example, a number of the lowest priority data flows offloaded from the high reliability path, as determined by the data flow prioritization, may be selected for dropping while the remaining data flows offloaded from the high reliability path are routed over the unpredictable reliability path.

In operation according to embodiments of the invention, fairness logic may be applied with respect to the determination to drop one or more data flows. For example, where a plurality of data flows with the same priority are present in the offloaded data flows and unpredictable reliability path capacity allows for carrying some, but not all, such data flows, embodiments may implement a fairness scheme to avoid unfair results. In one embodiment, path selection logic may comprise memory to determine a particular user device, origination point, destination point, application type, etc. having had an associated data flow previously dropped and thus select a data flow for a different user device, origination point, destination point, application type, etc. to be dropped. In another embodiment, path selection logic may employ a randomizer when selecting the particular data flow to be dropped, thereby implementing some level of fairness over time.

After routing all of the offloaded data flows over the unpredictable reliability path (block 307) or dropping some offloaded data flows (block 308), processing according to the illustrated embodiment proceeds to block 309. At block 309 a determination is made as to whether the traffic demand has receded such that all the data flows may be carried by the high reliability path. If the backhaul traffic demand has not receded to a point that the high reliability path can carry all of the data flows, processing according to the illustrated embodiment returns to block 303 for operation to make routing decisions appropriate to any changes in the congestion then being experienced. However, if the backhaul traffic demand has receded to a point that the high reliability path can carry all of the data flows, processing according to the illustrated embodiment returns to block 301 for routing of all the data flows over the high reliability path.

Determinations as to whether the traffic demand has receded such that all data flows may be carried by the high reliability path may implement a hysteresis period (e.g., seconds or minutes) to avoid repeated rerouting of data flows as a result of brief drops in traffic demand. For example, the determinations made at block 309 of embodiments may determine if the high reliability path capacity availability meets a threshold percentage of free capacity, a threshold amount of free capacity, free capacity sufficient to accommodate one or more flows currently routed over the unpredictable reliability path, etc. for some threshold amount of time before rerouting one or more low priority flow from the unpredictable reliability path to the high reliability path.

It should be appreciated that the routing of data flows over one or another of the backhaul link paths is not limited to routing to alleviate congestion according to embodiments herein. For example, in case of high reliability path failure, all traffic may be routed over unpredictable reliability path. When the unpredictable reliability path is at capacity, the lowest priority traffic may be dropped (e.g., the bandwidth of the unpredictable reliability path may be shared among competing flows as per provisioned QoS rules). In case of unpredictable reliability path failure, all traffic may be routed over the high reliability path. When the high reliability path is at capacity, the lowest priority traffic may be dropped (e.g., the bandwidth of the high reliability path may be shared among competing flows as per provisioned QoS rules).

Figure 4:
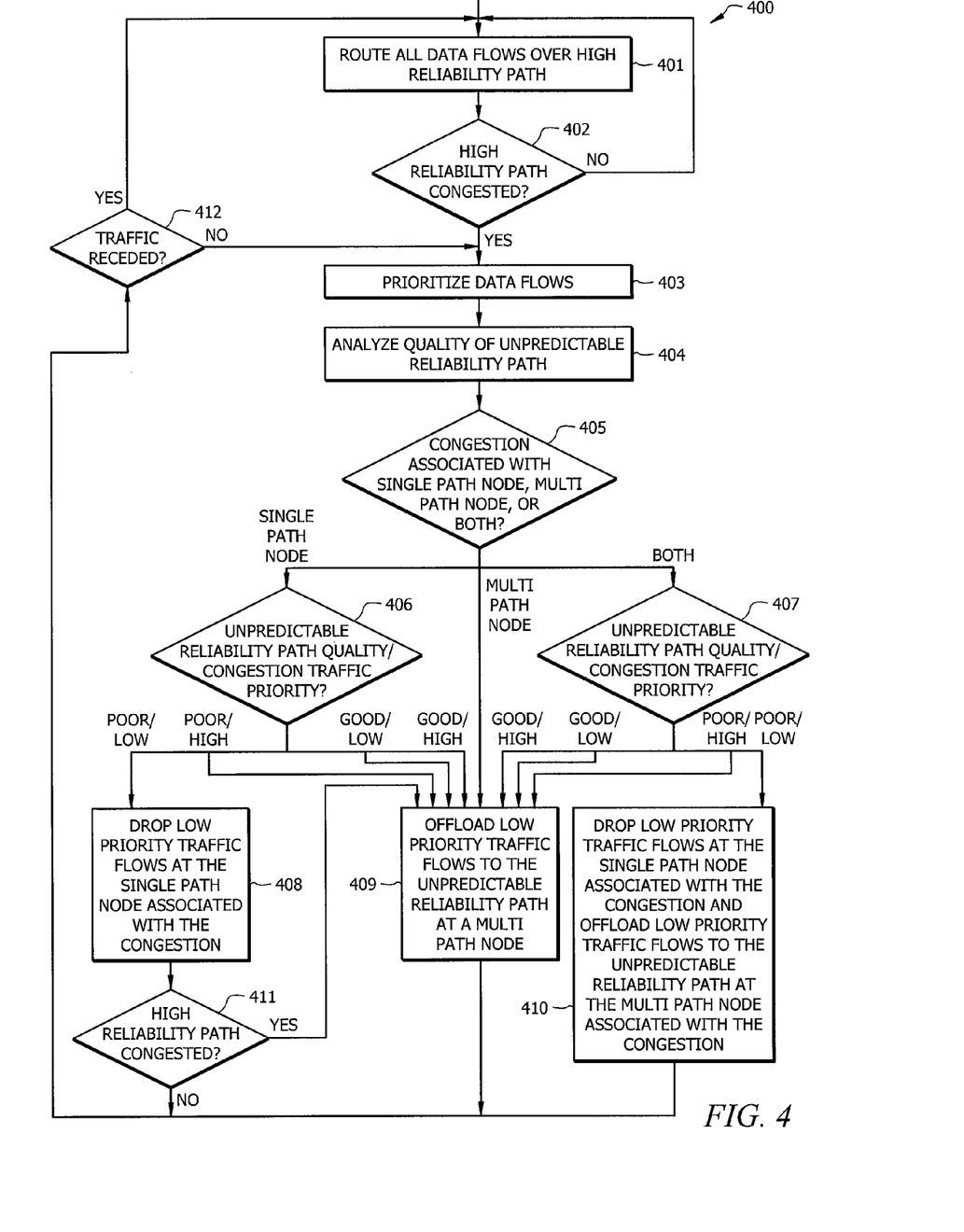
FIG. 4 shows a flow diagram of backhaul link path selection control with respect to a point-to-multipoint backhaul transport configuration of embodiments of the invention.

In a point-to-multipoint backhaul transport configuration the path selection logic may provide for all backhaul data to be carried by high reliability paths of the point-to-multipoint backhaul links (e.g., backhaul links 122a and 122c and the high reliability path of heterogeneous backhaul link 122b of FIG. 1A) until the capacity of a shared backhaul link resource of the high reliability paths is neared or reached. Thereafter, the backhaul link path selection control may determine data, if any, to be carried by an unpredictable reliability path of one or more backhaul link of the point-to-multipoint backhaul links (e.g., the unpredictable reliability path of heterogeneous backhaul link 122b) during the period in which the shared backhaul link resource is congested. Flow 400 of FIG. 4 shows operation of embodiments of path selection logic (e.g., path selection logic 212 and/or path selection logic 222 of hub 210 and access point(s) 220 of FIG. 2) to provide data flow routing and/or dropping control with respect to a point-to-multipoint heterogeneous backhaul link configuration consistent with the foregoing.

It should be appreciated that in point-to-multipoint operation, multiple ones of access point 220 may be in communication with hub 210 (e.g., as represented in point-to-multipoint backhaul transport portion 120 of FIG. 1A). One or more such access points may comprise high reliability path radio 223, unpredictable reliability path radio 226, and path selection logic 222 supporting a heterogeneous backhaul link. Moreover, access points utilized in accordance with embodiments of the invention may comprise high reliability path radio 223 without unpredictable reliability path radio 226 and path selection logic 222 supporting a backhaul link having only a high reliability path. In operation according to embodiments herein, the high reliability paths of each backhaul link of the point-to-multipoint backhaul transport configuration share resources (e.g., utilize a same channel frequency) such that capacity used with respect to one access point of the multipoint group is not available for use by the other access points of the multipoint group.

Although exemplary point-to-multipoint network configurations are described below with reference to a network configuration including both access point(s) having a multiple path backhaul link and access point(s) having a single path backhaul link, the concepts of the present invention are not limited to applicability to network configurations including access points of each such type. For example, the concepts herein may be utilized to provide offloading of low priority traffic at an access point having a multiple path backhaul link where another access point itself having a multiple path backhaul link is associated with high priority traffic causing the congestion.

At block 401 of the illustrated embodiment all data flows are routed over the high reliability paths of the point-to-multipoint backhaul links. Accordingly, the high reliability paths provide the primary backhaul link data paths according to the illustrated embodiment.

At block 402 a determination is made as to whether the high reliability paths are experiencing congestion. For example, the demand for backhaul data flow communication may be analyzed with respect to the capacity of the high reliability path to determine if the high reliability path is at or near capacity (e.g., the shared capacity is fully, or within a threshold amount of fully, utilized). It should be appreciated that, due to the shared nature of the high reliability path backhaul link resources according to embodiments, the congestion may be associated with traffic spread across a number of the multipoint backhaul links or may be concentrated in only one or a few of the multipoint backhaul links. Nevertheless, the use of the shared capacity in any of the multipoint backhaul links renders that capacity unavailable for use in the other multipoint links according to embodiments. If the high reliability paths are not congested, processing according to the illustrated embodiment returns to block 401 for all data flows to be routed over the corresponding high reliability paths. However, if the high reliability paths are congested, processing according to the illustrated embodiment proceeds to block 403.

At block 403 of the illustrated embodiment the backhaul data flows are prioritized. For example, the data flows may be prioritized based upon QoS requirements for the data flows, fairness metrics for the data flows, aspects of the data flows (e.g., application type, Internet protocol (IP) address, port, etc.), and/or the like.

At block 404 of the illustrated embodiment the quality of the unpredictable reliability path(s) of the heterogeneous backhaul link(s) is analyzed (e.g. PER, RSSI, SINR, etc.). For example, because of the unpredictable reliability of these paths, the quality of the path may vary with time, such as due to variations in interference, noise, etc. The instantaneous quality of the unpredictable reliability path may limit the capacity, bandwidth, throughput, or even availability of the unpredictable reliability path at any particular time.

As previously mentioned, the high reliability link congestion may be associated with traffic spread across a number of the multipoint backhaul links or may be concentrated in only one or a few of the multipoint backhaul links. Accordingly, at block 405 a determination is made as to the access point of the multipoint group associated with the traffic causing the congestion. For example, the backhaul traffic associated with (e.g., transmitted to and/or from) each access point of the multipoint group may be analyzed to determine the one or more access points associated with the traffic causing the congestion. Where a particular access point is associated with a predominant amount of the traffic, that access point may be identified as associated with the congestion. Where the traffic is spread across a number of access points, the access points contributing some threshold level of traffic, or some percentage of traffic above other of the access points, may be identified as associated with the congestion. Additionally or alternatively, the portion of the shared resources of the high reliability link used by communications associated with each access point may be used in determining the source of congestion. For example, if communications associated with an access point are utilizing more than some threshold of shared resources of the high reliability link, or if multiple access points are using more of the shared resources than the other access points, they may be identified as being associated with the congestion.

As can be appreciated from the illustrated embodiment of flow 400, the path selection logic may provide different routing of flows during high reliability path congestion depending upon the backhaul link capabilities of the access point associated with the congestion. In operation according to the illustrated embodiment, if the source of the congestion is identified as an access point having a single path backhaul link (e.g., a high reliability link) processing proceeds to block 406, if the source of the congestion is identified as an access point having a backhaul link with multiple paths (heterogeneous backhaul link) processing proceeds to block 409, and if the source of the congestion is identified as both an access point having a single path backhaul link and an access point having a backhaul link with multiple paths processing proceeds to block 407.

It should be appreciated that although examples herein are discussed with respect to an access point having a single path backhaul link and an access point having a multiple path backhaul link, the concepts are not restricted to the use of a point-to-multipoint backhaul transport configuration having only two access points in communication with a hub. Accordingly, the concepts can be extended for multiple access points (e.g., a plurality of single path backhaul link access points and/or a plurality of multiple path backhaul link access points) and the analysis and determinations described below may be applied with respect to each such access point.

When an access point having a single path backhaul link (e.g., a high reliability link) is identified as associated with the congestion, a determination is made regarding the quality of the unpredictable reliability path(s) of the multipoint access points having multiple backhaul link paths (e.g., a high reliability link and a unpredictable reliability link) and regarding the priority of the congestion traffic (i.e., the traffic associated with the access point identified with the congestion) at block 406. The path selection logic of the illustrated embodiment provides different routing of flows during high reliability path congestion depending upon the quality of the unpredictable reliability paths and the congestion traffic priority.

For example, when an access point having a single path backhaul link is identified as associated with the congestion (block 405), if the quality of the unpredictable reliability path(s) of the multipoint access points having multiple backhaul link paths is poor and the priority of the congestion traffic is low, processing according to the illustrated embodiment proceeds from bock 406 to block 408. At block 408 sufficient low priority data flows associated with the single path backhaul link causing the congestion is dropped, thereby alleviating the congestion on the high reliability paths. It should be appreciated that, in this case, the illustrated embodiment operates to drop low priority traffic associated with an access point having a single path backhaul link to avoid "punishing" the traffic associated with an access point having both a high reliability path and an unpredictable priority path which is not the source of the congestion. That is, low priority traffic associated with the access point identified with the congestion is dropped rather than having traffic communicated by a different access point offloaded to the unpredictable reliability path of its backhaul link to accommodate the congestion.

Processing according to the illustrated embodiment proceeds from block 408 to block 411 for a determination as to whether the high reliability paths remain congested after the low priority congestion traffic is dropped. If, after dropping the low priority congestion traffic, the high reliability paths are no longer congested, processing according to the illustrated embodiment proceeds to block 412. However, if the high reliability paths remain congested (i.e., sufficient low priority traffic to alleviate the congestion is not dropped), processing according to the illustrated embodiment proceeds to block 409 wherein low priority data flows (if any) associated with one or more multiple path backhaul link not causing the congestion may be offloaded to a corresponding unpredictable reliability path to alleviate the congestion on the high reliability paths. In this case the illustrated embodiment operates to offload low priority traffic associated with an access point other than that associated with the traffic causing the congestion in order to accommodate the high priority traffic at the access point having a single path backhaul link. It should be appreciated that the extent of the "punishment" of the access points which are not associated with the cause of the congestion to accommodate high priority traffic of another access point is limited according to embodiments to low priority traffic (e.g., as may be associated with particular types of traffic, particular sources/destinations, particular applications, etc.).

Similarly, if an access point having a single path backhaul link is identified as associated with the congestion (block 405), the quality of the unpredictable reliability path(s) of the multipoint access points having multiple backhaul link paths is poor, and the priority of the congestion traffic is high, processing according to the illustrated embodiment proceeds from block 406 to block 409. At block 409 low priority data flows (if any) associated with one or more multiple path backhaul link not causing the congestion may be offloaded to a corresponding unpredictable reliability path to alleviate the congestion on the high reliability paths. In this case the illustrated embodiment operates to offload low priority traffic associated with an access point other than that associated with the traffic causing the congestion in order to accommodate the high priority traffic at the access point having a single path backhaul link. It should be appreciated that the extent of the "punishment" of the access points which are not associated with the cause of the congestion to accommodate high priority traffic of another access point is limited according to embodiments to low priority traffic (e.g., as may be associated with particular types of traffic, particular sources/destinations, particular applications, etc.). Accordingly, in operation according to embodiments of the invention, high priority traffic is not offloaded to an unpredictable reliability path to minimize the impact (e.g., QoS) to the communications which have not been identified as a cause of the congestion. It should be appreciated that, where sufficient low priority traffic for offloading to accommodate the high priority congestion traffic is not present with respect to a multiple path backhaul link, high priority traffic which is identified with the cause of the congestion may be dropped according to embodiments.

If an access point having a single path backhaul link is identified as associated with the congestion (block 405), the quality of the unpredictable reliability path(s) of the multipoint access points having multiple backhaul link paths is good, and either the priority of the congestion traffic is high or low, processing according to the illustrated embodiment proceeds from block 406 to block 409. Because the quality of the unpredictable reliability path is determined to be good, offloading of traffic from a high reliability path to a corresponding unpredictable reliability path, even for traffic not identified as causing the congestion, is not expected to result in a significant impact (e.g., QoS) to the offloaded traffic. Accordingly, the traffic causing the congestion may thus be accommodated through offload of traffic at a multiple path backhaul link without "punishing" of the access points which are not associated with the cause of the congestion. Of course, where the unpredictable reliability link does not provide sufficient throughput to accommodate offloading of sufficient traffic to accommodate the congestion traffic at the single path backhaul link, some of the congestion traffic may be dropped according to embodiments herein.

When an access point having a multiple path backhaul link is identified as associated with the congestion, the path selection logic of the illustrated embodiment provides for offloading of traffic from the high reliability path to the corresponding unpredictable reliability path of the multiple path backhaul link. Accordingly, if an access point having a multiple path backhaul link is identified as associated with the congestion (block 405), processing according to the illustrated embodiment proceeds from block 405 to block 409. Because the traffic is associated with an access point having a multiple path backhaul link, offloading of congestion traffic from a high reliability path to a corresponding unpredictable reliability path does not "punish" traffic which is not the cause of congestion. Accordingly, the traffic causing the congestion may thus be accommodated through offload of at least some portion of the traffic at the multiple path backhaul link associated with the congestion. Of course, where the unpredictable reliability link does not provide sufficient throughput to accommodate offloading of sufficient traffic to accommodate the congestion traffic at the multiple path backhaul link, some of the congestion traffic may be dropped according to embodiments herein.

When both an access point having a single path backhaul link and an access point having a multiple path back haul link are identified as associated with the congestion, a determination is made regarding the quality of the unpredictable reliability path(s) of the multipoint access points having multiple backhaul link paths and regarding the priority of the congestion traffic (i.e., the traffic associated with the access point identified with the congestion) at block 407. The path selection logic of the illustrated embodiment provides different routing of flows during high reliability path congestion depending upon the quality of the unpredictable reliability paths and the congestion traffic priority.

For example, if both an access point having a single path backhaul link and an access point having a multiple path backhaul link are identified as associated with the congestion (block 405), the quality of the unpredictable reliability path(s) of the multipoint access points having multiple backhaul link paths is poor, and the priority of the congestion traffic is low, processing according to the illustrated embodiment proceeds from block 405 to block 410. At block 410 low priority data flows associated with the single path backhaul link causing the congestion are dropped and low priority data flows associated with the multiple path backhaul link causing the congestion are offloaded to an unpredictable reliability path, thereby alleviating the congestion on the high reliability paths. In operation according to embodiments, low priority traffic is offloaded to the unpredictable reliability path sufficient to avoid or mitigate the contribution of congestion by the traffic remaining on the high reliability path in association with the multiple path backhaul link. For example, with only 2 access points sharing the backhaul link resource, each access point may use up to 50% of shared resources without causing congestion. If, however, the traffic associated with one of the access points increases beyond 50% (e.g., to 60%) of available capacity, that traffic may be identified as causing congestion. In this case the excess 10% of this particular access point's traffic may be offloaded to the unpredictable reliability path, assuming the access point has a multiple path backhaul link. This offloading of traffic brings its traffic on the high reliability link back to 50% of available capacity, and thus may no longer be considered to cause congestion. It should be appreciated that, through implementation of the foregoing concepts, the illustrated embodiment operates to optimize the offloading and dropping of low priority congestion traffic to minimize impact (e.g., QoS) at either access point associated with the congestion.

If, however, both an access point having a single path backhaul link and an access point having a multiple backhaul link are identified as associated with the congestion (block 405), the quality of the unpredictable reliability path(s) of the multipoint access points having multiple backhaul link paths is poor, and the priority of the congestion traffic is high, processing according to the illustrated embodiment proceeds from block 407 to block 409. At block 409 low priority data flows (if any) associated with the multiple path backhaul link causing the congestion may be offloaded to a corresponding unpredictable reliability path to alleviate the congestion on the high reliability paths without impacting the high priority traffic at the single path and the multiple path backhaul links, where possible. Moreover, as discussed above, embodiments may operate to offload low priority traffic associated with an access point other than that associated with the traffic causing the congestion in order to accommodate the high priority traffic at other access points. It should be appreciated that the extent of the "punishment" of the access points which are not associated with the cause of the congestion to accommodate high priority traffic of another access point is limited according to embodiments to low priority traffic (e.g., as may be associated with particular types of traffic, particular sources/destinations, particular applications, etc.). Accordingly, in operation according to embodiments of the invention, high priority traffic is not offloaded to an unpredictable reliability path to minimize the impact (e.g., QoS) to the communications which have not been identified as a cause of the congestion. It should be appreciated that, where sufficient low priority traffic for offloading to accommodate the high priority congestion traffic is not present with respect to a multiple path backhaul link, high priority traffic which is identified with the cause of the congestion may be dropped according to embodiments.

If both an access point having a single path backhaul link and an access point having a multiple path backhaul link are identified as associated with the congestion (block 405), the quality of the unpredictable reliability path(s) of the multipoint access points having multiple backhaul link paths is good, and either the priority of the congestion traffic is high or low, processing according to the illustrated embodiment proceeds from block 407 to block 409. Because the quality of the unpredictable reliability path is determined to be good, offloading of traffic from a high reliability path to a corresponding unpredictable reliability path, even for traffic not identified as causing the congestion, is not expected to result in a significant impact (e.g., QoS) to the offloaded traffic. Accordingly, the traffic causing the congestion may thus be accommodated through offload of traffic at a multiple path backhaul link (e.g., traffic of a multiple path backhaul link access point associated with the congestion) with little impact (e.g., QoS) on the traffic. Moreover, traffic may even be offloaded from an access point not associated with the congestion, if needed, without "punishing" such access points. Of course, where the unpredictable reliability link does not provide sufficient throughput to accommodate offloading of sufficient traffic to accommodate the congestion traffic at the single path backhaul link, some of the congestion traffic may be dropped according to embodiments herein.

After offloading and/or dropping traffic at blocks 409 and 410, and after it is determined that the high reliability paths are not congested at block 411, processing according to the illustrated embodiment proceeds to block 412. At block 412 a determination is made as to whether the traffic demand has receded such that all the data flows may be carried by the high reliability paths. If the backhaul traffic demand has not receded to a point that the high reliability paths can carry all of the data flows, processing according to the illustrated embodiment returns to block 403 for operation to make routing decisions appropriate to any changes in the congestion then being experienced. However, if the backhaul traffic demand has receded to a point that the high reliability path can carry all of the data flows, processing according to the illustrated embodiment returns to block 401 for routing of all the data flows over the high reliability path.

As discussed above, determinations as to whether the traffic demand has receded such that all data flows may be carried by the high reliability path may implement a hysteresis period (e.g., seconds or minutes) to avoid repeated rerouting of data flows as a result of brief drops in traffic demand. For example, the determinations made at block 412 of embodiments may determine if the high reliability path capacity availability meets a threshold percentage of free capacity, a threshold amount of free capacity, free capacity sufficient to accommodate one or more flows currently routed over the unpredictable reliability path, etc. for some threshold amount of time before rerouting one or more low priority flow from the unpredictable reliability path to the high reliability path.

It should be appreciated that the foregoing provides particular routing decisions based upon the backhaul link configuration(s) associated with the congestion, the quality of the unpredictable reliability link(s), and the priority of the congestion traffic as may be made by path selection of embodiments herein are exemplary of application of the concepts herein. Embodiments of the invention may operate to provide different routing determinations. Irrespective of the particular routing determinations made, embodiments operate to optimize the balance of offloading traffic to an unpredictable reliability link to accommodate congestion traffic and impact to the data flows, while avoiding "punishing" flows which are not identified as the source of the congestion. In operation according to embodiments, high reliability resources may be allocated evenly, or fairly, when there is congestion. Accordingly, low priority traffic may be dropped at the single path backhaul link access points if the low reliability links on the multiple path backhaul link access points are unreliable and high priority traffic would be forced to the low reliability link.

As can be appreciated from the foregoing, in operation according to embodiments herein when there is overall congestion on the high reliability paths the system may disable or minimize the use of the high reliability paths for one or more access point having a multiple path backhaul link to alleviate congestion on the high reliability paths. Example decision criteria for implementing operation to reduce the high reliability path congestion include sending the lowest priority data flows over one or more unpredictable reliability path for access points that have a multiple path backhaul link. If high reliability path congestion remains after the offloading of data flows, embodiments may further operate to also offload the next lowest priority data flows over one or more unpredictable reliability path, and so on (e.g., to the point that all data flows for one or more multiple path backhaul link are offloaded to the unpredictable reliability paths, except perhaps signaling traffic). Accordingly, the excess traffic (i.e., congestion traffic) and/or low priority data flows are routed via one or more unpredictable reliability path during periods of congestion.

As congestion reduces, traffic is brought back on to the high reliability path, first with the high priority flows, then with the next highest priority flows, etc., according to embodiments herein.

Also as can be appreciated from the foregoing, embodiments operate to implement monitoring and adaptation of traffic routing determinations based upon the quality of the unpredictable reliability paths. A goal of this operation is to ensure fair allocation of traffic between the high reliability paths and unpredictable reliability paths. For instance, if there is too much low priority traffic on a backhaul link of an access point having a single path (i.e., high reliability path) backhaul link, this traffic may overload the whole sector without application of the concepts herein. Accordingly, backhaul link path selection control of embodiments herein responds to this excess traffic by routing low priority data flows, and potentially even high priority data flows, of multiple path backhaul links over the unpredictable reliability paths.

By monitoring the reliability of the unpredictable reliability paths carrying this rerouted traffic, embodiments can minimize the impact (e.g., QoS) on the rerouted data flows and avoid punishing high priority traffic associated with access points having a multiple path backhaul link due to excess low priority data flows associated with other access points. For example, the quality of the unpredictable reliability paths may be monitored as well as the proportion of traffic that is low priority and high priority on each backhaul link and the overall traffic congestion may be monitored. If the congestion is caused by excessive low priority traffic on a single path backhaul link, then backhaul link path selection control of embodiments may reroute traffic of multiple path backhaul links to an unpredictable reliability path, as long as that unpredictable reliability path has good reliability. Otherwise, the backhaul link path selection control may drop the excess low priority traffic of a single path backhaul link identified as causing the congestion in order to relieve the congestion. If the congestion is caused by excessive high priority traffic on a single path backhaul link, then backhaul link path selection control of embodiments may reroute low priority traffic of multiple path backhaul links to an unpredictable reliability path. If the congestion is caused by excessive low priority traffic on multiple path backhaul links, then backhaul link path selection control of embodiments may reroute low priority traffic of the multiple path backhaul links to the unpredictable reliability paths.

Embodiments may utilize various weighting or other routing distribution algorithms in implementing particular routing decisions herein. For example, a weighting algorithm may be applied with respect to the low priority traffic (e.g., based on the quality, such as PER, of an unpredictable reliability path) in determining whether to offload one or more data flow associated with an access point having a multiple path backhaul link to the unpredictable reliability path. If the unpredictable reliability path or the low priority traffic implement an error recovery mechanism (e.g., ARQ for link or TCP traffic), for example, embodiments may operate to route a portion of the traffic associated with an access point having a multiple path backhaul link to an unpredictable reliability path of that backhaul link in the foregoing situations where determinations are made regarding the offloading of data flows to an unpredictable reliability link. Such embodiments may operate to monitor the latency (e.g., due to retransmission) of these rerouted data flows for providing control of the routing. For example, path selection logic may operate to gradually increase the amount of rerouted traffic as long as the latency is acceptable.

In operation according to embodiments of the invention, determinations regarding the routing of data flows are centralized. For example, although many access points may be active in the routing of particular data flows over either an associated high reliability path or unpredictable reliability path, a single entity may operate to determine which flows are to be offloaded to the unpredictable reliability path(s). Thus, although both hub 210 and access point 220 of FIG. 2 are shown as including path selection logic, only path selection logic 212 of hub 210 may make the determinations set forth in flows 300 and 400 of FIGS. 3 and 4 above. Path selection logic 222 of access point 220 may control routing of particular data flows transmitted over the backhaul link, such as under control of path selection logic 212 of hub 210, without itself making the routing determinations. Accordingly, signaling (e.g., within a control channel, as part of packet header information, etc.) may be provided by hub 210 to access point 220 to control uplink path selection according to embodiments. Corresponding downlink signaling may not be implemented, such as where access point 220 is operable to monitor both high reliability path radio 223 and unpredictable reliability path radio 226 to thereby determine the routing determinations made by hub 210.

It should be appreciated from the foregoing that, in operation according to embodiments herein, the decisions regarding the routing of backhaul data made by the path selection logic of embodiments may be made with respect to data flows rather than for individual data packets. Accordingly, the number of data flows, and correspondingly the number of network nodes, affected by the use of an unpredictable reliability path for backhaul transport of data and/or the dropping of data according to embodiments may be minimized. Moreover, there is no need for the reordering of the packets of each data flow, as the packets for a data flow will be routed through one backhaul path (as opposed to the case where some packets of one data flow are routed ad hoc through multiple paths, such as the high reliability path and unpredictable reliability path, where the two paths could have different packet error rate and/or latency, and hence the packets may arrive out of order at the receiver).

The routing decisions made by backhaul link path selection control of embodiments are not restricted to applicability to offloading traffic from a high reliability path to a corresponding unpredictable reliability path of a backhaul link. For example, embodiments (e.g., embodiments implementing a mesh network or other configuration having appropriate communication paths available between various access points and/or other network nodes) may operate to reroute data flows from a single path backhaul link to a multiple path backhaul link, such as for transmission using an unpredictable reliability path of the multiple path backhaul link, such as to avoid dropping one or more data flow during periods of congestion Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   communicating a plurality of data flows over a high reliability path of a heterogeneous backhaul link, wherein the heterogeneous backhaul link comprises the high reliability path and an unpredictable reliability path, wherein the heterogeneous backhaul link is provided by a point-to-multipoint backhaul transport configuration, the point-to-multipoint backhaul transport configuration including the heterogeneous backhaul link providing a multiple path backhaul link and at least one other backhaul link having a high reliability path sharing a resource with the high reliability path of the heterogeneous backhaul link, and wherein the plurality of data flows include one or more high priority data flow and one or more low priority data flow;
   detecting congestion with respect to communication over the high reliability path of the heterogeneous backhaul link;
   determining a backhaul link associated with the congestion;
   analyzing quality of the unpredictable reliability path; and
   offloading of one or more data flow based at least in part on the backhaul link associated with the congestion, the quality of the unpredictable reliability path, and priority of the one or more data flow, wherein the offloading is controlled such that at least a portion of the one or more low priority data flow carried by the high reliability path of the heterogeneous backhaul link is offloaded from the high reliability path to the unpredictable reliability path and at least a portion of the one or more high priority data flow continue to be communicated via the high reliability path after the offloading when the at least one other backhaul link is determined to be associated with the congestion and the quality of the unpredictable reliability path is high.

2. The method of claim 1, further comprising:
   monitoring communication over the high reliability path of the heterogeneous backhaul link after the offloading; and
   rerouting at least a portion of the offloaded one or more data flow from the unpredictable reliability path to the high reliability path when the monitoring indicates adequate capacity in the high reliability path for the at least a portion of the offloaded one or more data flow.

3. The method of claim 1, wherein high priority data flows are offloaded from the high reliability path to the unpredictable reliability path when the quality of the unpredictable reliability path is high.

4. The method of claim 1, wherein only low priority data flows of the communication are offloaded from the high reliability path to the unpredictable reliability path when the quality of the unpredictable reliability path is low.

5. The method of claim 1, wherein the at least one other backhaul link comprises a single path backhaul link.

6. The method of claim 1, wherein the at least one other backhaul link comprise a multiple path backhaul link.

7. The method of claim 1, wherein one or more low priority data flow carried by the at least one other backhaul link are dropped when the at least one other backhaul link is determined to be associated with the congestion.

8. The method of claim 1, wherein one or more data flow carried by the at least one other backhaul link are dropped when the at least one other backhaul link is determined to be associated with the congestion and the quality of the unpredictable reliability path is low.

9. The method of claim 1, wherein one or more low priority data flow carried by the multiple path backhaul link is offloaded from the high reliability path to the unpredictable reliability path when the multiple path backhaul link is determined to be associated with the congestion.

10. The method of claim 9,
    wherein one or more high priority data flow carried by the high reliability path of the heterogeneous backhaul link is offloaded from the high reliability path to the unpredictable reliability path when the high reliability path of the heterogeneous backhaul link is determined to be associated with the congestion and the quality of the unpredictable reliability path is high.

11. The method of claim 1, wherein priority of the data flows is determined at least in part from quality of service requirements for the data flows.

12. The method of claim 1, wherein priority of the data flows is determined at least in part from a source or destination of the data flows.

13. The method of claim 1, wherein priority of the data flows is determined at least in part from applications associated with the data flows.

14. A system comprising:
    a first backhaul node having circuitry operable to establish a heterogeneous backhaul link comprising a high reliability path and an unpredictable reliability path; and
    a second backhaul node having circuitry operable to establish the heterogeneous backhaul link, wherein the first and second backhaul nodes are nodes of a point-to-multipoint backhaul transport configuration, the point-to-multipoint backhaul transport configuration including the heterogeneous backhaul link providing a multiple path backhaul link and at least one other backhaul link having a high reliability path sharing a resource with the high reliability path of the heterogeneous backhaul link, and wherein at least one of the first and second backhaul node includes path selection logic operable to:
    detect congestion with respect to communication over the high reliability path;
    determine a backhaul link associated with the congestion;
    analyze quality of the unpredictable reliability path; and
    control offloading of one or more data flow based at least in part on the backhaul link associated with the congestion, the quality of the unpredictable reliability path, and priority of the one or more data flow,
    wherein a plurality of data flows are communicated over the high reliability path of the heterogeneous backhaul link, the plurality of data flows including one or more high priority data flow and one or more low priority data flow,
    wherein the path selection logic is operable to control the offloading of the one or more data flow such that the offloaded one or more data flow include at least a portion of the one or more low priority data flow carried by the high reliability path of the heterogeneous backhaul link when the at least one other backhaul link is determined to be associated with the congestion and quality of the unpredictable reliability path is high, and wherein at least a portion of the one or more high priority data flow continue to be communicated via the high reliability path after the offloading.

15. The system of claim 14, wherein the path selection logic is operable to offload high priority data flows from the high reliability path of the heterogeneous backhaul link to the unpredictable reliability path when the quality of the unpredictable reliability path is high.

16. The system of claim 14, wherein the path selection logic is operable to control one or more low priority data flow carried by the at least one other backhaul link being dropped when the at least one other backhaul link is determined to be associated with the congestion.

17. The system of claim 14, wherein the path selection logic is operable to:
control the offloading to cause one or more data flow carried by the at least one other backhaul link to be dropped when the at least one other backhaul link is determined to be associated with the congestion and the quality of the unpredictable reliability path is low.

18. The system of claim 14, wherein the path selection logic is operable to control the offloading of the one or more data flow from the high reliability path to the unpredictable reliability path to cause one or more high priority data flow carried by the multiple path backhaul link to be offloaded from the high reliability path to the unpredictable reliability path when the multiple path backhaul link is determined to be associated with the congestion and the quality of the unpredictable reliability path is high.

19. A non-transitory computer-readable storage medium storing instructions that, when executed by a processor, cause the processor to perform operations comprising:
communicating a plurality of data flows over at least one path of a heterogeneous backhaul link, wherein the heterogeneous backhaul link is provided by a point-to-multipoint backhaul transport configuration, the point-to-multipoint backhaul transport configuration including the heterogeneous backhaul link providing a multiple path backhaul link and at least one other backhaul link having a high reliability path sharing a resource with the high reliability path of the heterogeneous backhaul link, wherein the heterogeneous backhaul link comprises a high reliability path and an unpredictable reliability path, and wherein the plurality of data flows include one or more high priority flow and one or more low priority data flow;
detecting congestion with respect to communication over the high reliability path;
determining a backhaul link associated with the congestion;
analyzing quality of the unpredictable reliability path; and
offloading one or more data flow based at least in part upon the backhaul link associated with the congestion, priority of the one or more data flow, and the quality of the unpredictable reliability path, wherein the offloading is controlled such that one or more low priority data flow carried by the high reliability path of the heterogeneous backhaul link is offloaded from the high reliability path to the unpredictable reliability path when the at least one other backhaul link is determined to be associated with the congestion and the quality of the unpredictable reliability path is high and at least a portion of the one or more high priority data flow continue to be communicated via the high reliability path.

20. The non-transitory computer-readable storage medium of claim 19, wherein the operations include:
monitoring communication over the high reliability path of the heterogeneous backhaul link after the offloading; and
rerouting at least a portion of the offloaded one or more data flow from the unpredictable reliability path to the high reliability path when the monitoring indicates adequate capacity in the high reliability path for the at least a portion of the offloaded one or more data flow.

21. The non-transitory computer-readable storage medium of claim 19, wherein high priority data flows are offloaded from the high reliability path to the unpredictable reliability path when the quality of the unpredictable reliability path is high.

22. The non-transitory computer-readable storage medium of claim 19, wherein only the low priority data flows are offloaded from the high reliability path to the unpredictable reliability path when the quality of the unpredictable reliability path is low.

23. The non-transitory computer-readable storage medium of claim 19, wherein one or more low priority data flow carried by the at least one other backhaul link are dropped when the at least one other backhaul link is determined to be associated with the congestion.

24. The non-transitory computer-readable storage medium of claim 19, wherein one or more data flow carried by the at least one other backhaul link are dropped when the at least one other backhaul link is determined to be associated with the congestion and the quality of the unpredictable reliability path is low.

25. The non-transitory computer-readable storage medium of claim 19, wherein one or more low priority data flow carried by the multiple path backhaul link is offloaded from the high reliability path to the unpredictable reliability path when the multiple path backhaul link is determined to be associated with the congestion.

26. The non-transitory computer-readable storage medium of claim 19,
wherein the operations include offloading one or more high priority data flow carried by the multiple path backhaul link from the high reliability path to the unpredictable reliability path when the multiple path backhaul link is determined to be associated with the congestion and the quality of the unpredictable reliability path is high.

27. The non-transitory computer-readable storage medium of claim 19, wherein priority of the data flows is determined at least in part from quality of service requirements for the data flows.

28. The non-transitory computer-readable storage medium of claim 19, wherein priority of the data flows is determined at least in part from a source or destination of the data flows.

29. The non-transitory computer-readable storage medium of claim 19, wherein priority of the data flows is determined at least in part from applications associated with the data flows.

* * * * *